UNITED STATES PATENT OFFICE.

CHARLES LEE REESE, OF WILMINGTON, DELAWARE, ASSIGNOR, BY MESNE ASSIGNMENTS, TO THE ARLINGTON COMPANY, OF ARLINGTON, NEW JERSEY, A CORPORATION OF NEW JERSEY.

PROCESS OF STABILIZING NITROCELLULOSE AND PRODUCT THEREOF.

1,358,653.  Specification of Letters Patent.  Patented Nov. 9, 1920.

No Drawing.  Application filed December 8, 1916. Serial No. 135,758.

*To all whom it may concern:*

Be it known that I, CHARLES LEE REESE, of Wilmington, in the county of New Castle and in the State of Delaware, have invented a certain new and useful Improvement in Processes of Stabilizing Nitrocellulose and Products Thereof, and do hereby declare that the following is a full, clear, and exact description thereof.

My invention relates particularly to a process of stabilizing nitrocellulose, but it relates especially to stabilizing the lower nitrates of cellulose and compositions containing the same.

The object of my invention is to provide a process of stabilizing the lower nitrates of cellulose and compositions containing the same and the product thereof in such a manner that the stabilizing may be carried out more effectively, more cheaply, and with a smaller proportion of the stabilizer than in the case of stabilizing agents previously used.

In accordance with my invention I may use dicyandiamid, which when used in connection with the lower nitrates of cellulose and compositions containing the same, produces the desired stabilizing effect, so that even with the addition of an amount of the dicyandiamid much smaller than the amount of other stabilizing agents previously used the product may be subjected to higher temperatures without combustion and may be subjected to a given temperature for a longer period without decomposition than in the case of compositions stabilized with other stabilizing agents.

While my invention is capable of embodiment in many different forms, for the purpose of illustration I shall describe only one form thereof hereinafter.

For example, my invention may be carried out by adding an amount of dicyandiamid $NH:C(NH_2).NH.CN$. equal to from .1% to 2% of the nitrocellulose in a composition containing the following constituents:—

Soluble pyroxylin_____100 parts
        Camphor_____25 to 50 parts
        Ethyl alcohol_____10 to 30 parts By the term "soluble pyroxylin" is meant, the pyroxylin which will dissolve in a mixture of alcohol and ether, and it will be noted that there are preferably employed about two parts of camphor to one part of alcohol. Compositions of this kind will be found to have been stabilized by the presence of the dicyandiamid so that the product may be subjected to higher temperatures without decomposition, and may be subjected for a longer period to a given temperature without decomposition than in the case of similar products obtained by stabilization with other stabilizers, and these results can be obtained by the presence of a smaller quantity of the dicyandiamid than of the other stabilizers.

While I have described my invention above in detail, I wish it to be understood that many changes may be made therein without departing from the spirit of my invention.

I claim:—

1. A composition comprising soluble pyroxylin and dicyandiamid, the dicyandiamid being from .1% to 2% of the pyroxylin.

2. A composition comprising soluble pyroxylin, dicyandiamid and a solvent, the dicyandiamid being from .1% to 2% of the pyroxylin.

3. A composition comprising soluble pyroxylin, dicyandiamid and camphor, the dicyandiamid being from .1% to 2% of the pyroxylin.

4. A composition comprising soluble pyroxylin, dicyandiamid, camphor and a volatile solvent, the dicyandiamid being from .1% to 2% of the pyroxylin.

5. A composition comprising pyroxylin and dicyandiamid, the dicyandiamid being from .1% to 2% of the pyroxylin.

6. A composition comprising pyroxylin, dicyandiamid and a solvent, the dicyandiamid being from .1% to 2% of the pyroxylin.

7. A composition comprising pyroxylin, dicyandiamid and camphor, the dicyandiamid being from .1% to 2% of the pyroxylin.

8. A composition comprising pyroxylin, dicyandiamid, camphor and a volatile solvent, the dicyandiamid being from .1% to 2% of the pyroxylin.

9. A composition comprising soluble pyroxylin, dicyandiamid and ethyl alcohol, the alcohol being present in the ratio of between 10 and 30 parts to each 100 parts of pyroxylin.

10. A composition comprising soluble pyroxylin, dicyandiamid, camphor and ethyl alcohol, the camphor and alcohol being present in the ratio of about two to one.

In testimony that I claim the foregoing I have hereunto set my hand.

CHARLES LEE REESE.

Witnesses:
P. E. STRICKLAND,
WM. M. WHITTEN, Jr.